US011568500B1

(12) United States Patent
    Getter

(10) Patent No.: US 11,568,500 B1
(45) Date of Patent: Jan. 31, 2023

(54) GAS DISTRIBUTION MANAGEMENT SYSTEM

(71) Applicant: Madison Gas and Electric Company, Madison, WI (US)

(72) Inventor: Christopher Aaron Getter, Deforest, WI (US)

(73) Assignee: Madison Gas and Electric Company, Madison, WI (US)

( * ) Notice: Subject to any disclaimer, the term of this patent is extended or adjusted under 35 U.S.C. 154(b) by 60 days.

(21) Appl. No.: 17/105,192

(22) Filed: Nov. 25, 2020

Related U.S. Application Data

(60) Provisional application No. 62/942,929, filed on Dec. 3, 2019.

(51) Int. Cl.
   *G06Q 50/06*   (2012.01)
   *G01D 4/00*    (2006.01)
   *H02J 13/00*   (2006.01)

(52) U.S. Cl.
    CPC ............. *G06Q 50/06* (2013.01); *G01D 4/004* (2013.01); *H02J 13/00001* (2020.01)

(58) Field of Classification Search
    CPC .... G06Q 50/06; G01D 4/004; H02J 13/00001
    See application file for complete search history.

(56) References Cited

U.S. PATENT DOCUMENTS

| | | | | |
|---|---|---|---|---|
| 6,259,972 B1* | 7/2001 | Sumic | ................... | H02H 1/0092 700/286 |
| 7,739,138 B2* | 6/2010 | Chauhan | ................ | G06Q 10/06 705/7.14 |
| 8,417,391 B1* | 4/2013 | Rombouts | .............. | G05B 13/02 700/297 |
| 8,437,883 B2 | 5/2013 | Powell et al. | | |
| 10,193,778 B2* | 1/2019 | Vaswani | ................ | G01D 4/004 |
| 10,770,899 B2* | 9/2020 | Sheble | ...................... | H02J 3/14 |
| 2002/0198629 A1* | 12/2002 | Ellis | ...................... | G06Q 10/06 700/286 |
| 2007/0063866 A1* | 3/2007 | Webb | ..................... | G01D 4/004 340/870.02 |

(Continued)

OTHER PUBLICATIONS

GE, Advanced Distribution Management Solutions (ADMS), https://www.ge.com/digital/applications/advanced-distribution-management-solutions-adms, © 2020, 10 pages.

(Continued)

*Primary Examiner* — Ramesh B Patel
(74) *Attorney, Agent, or Firm* — Merchant & Gould P.C.

(57) ABSTRACT

An example distribution and outage management system can include: a processor; and memory encoding instructions which, when executed by the processor, causes the system to: provide a supervisory control and data acquisition module programmed to manage infrastructure elements of a distribution network; provide a geographic information system module programmed to manage spatial aspects of the distribution network; provide a distribution and outage module programmed to incorporate data from the supervisory control and data acquisition module and data from the geographic information system module to create a data management and outage model; and render an interface depicting the data management and outage model.

20 Claims, 12 Drawing Sheets

(56) References Cited

U.S. PATENT DOCUMENTS

| | | | |
|---|---|---|---|
| 2008/0172312 A1* | 7/2008 | Synesiou | G06Q 10/00 705/40 |
| 2010/0214123 A1* | 8/2010 | Smith | G01D 4/004 340/870.02 |
| 2012/0200423 A1* | 8/2012 | DiLuciano | H04Q 3/0062 340/10.3 |
| 2015/0007160 A1* | 1/2015 | Traill | H04L 41/12 717/171 |
| 2015/0350260 A1* | 12/2015 | Tadepalli | H02J 13/00006 709/203 |
| 2015/0355618 A1* | 12/2015 | Sharma | G05B 17/02 700/291 |
| 2019/0101411 A1* | 4/2019 | Davis | G01F 15/063 |
| 2020/0193339 A1* | 6/2020 | Bennett | G06Q 30/0201 |
| 2021/0334910 A1* | 10/2021 | Klocman | G01D 4/002 |

OTHER PUBLICATIONS

GE Grid Solutions, e-terraplatform 3.0, "The Power to Adopt," https://www.gegridsolutions.com/products/brochures/nms/e-terraplatform%203.0%20trans_gene%20100615.pdf, © 2015, 4 pages.
Endeavor Business Media, LLC, T&D World, "SCADA/EMS Platform is Upward-Compatible," https://www.tdworld.com/smart-utility/article/20959673/scadaems-platform-is-upwardcompatible, Aug. 31, 2020, 5 pages.
Alstom Grid Inc., excerpt from "SCADA User's Guide," Jul. 2, 2014, 1 page.

* cited by examiner

GAS DISTRIBUTION MANAGEMENT SYSTEM

BACKGROUND

Natural gas is a safe and efficient energy source typically used for heating and cooking. The gas is distributed from a source through a network of pipes to a desired destination such as a house, where it is then combusted. The network must be managed to provide safe and reliable delivery of the gas.

The demand for gas fluctuates over time. For example, during the winter months, the demand for gas can be significant in colder climates, where it is used to heat structures. The ability to manage the distribution of the gas can be a significant challenge, particularly when shutoffs and outages occur.

SUMMARY

In one non-limiting aspect, a distribution and outage management system includes: a processor; and memory encoding instructions which, when executed by the processor, causes the system to: provide a supervisory control and data acquisition module programmed to manage infrastructure elements of a distribution network; provide a geographic information system module programmed to manage spatial aspects of the distribution network; provide a distribution and outage module programmed to incorporate data from the supervisory control and data acquisition module and data from the geographic information system module to create a data management and outage model; and render an interface depicting the data management and outage model.

DETAILED DESCRIPTION

The present disclosure is directed to a gas distribution and outage management system. The gas distribution and outage management system provides a solution to a technical problem, namely the efficient management of the distribution of natural gas within a distribution network. In the examples provided herein, the system incorporates data from various sources to provide near real-time user interfaces that allow for management of the gas, including the modeling of distribution and shutoffs/outages.

While the examples provided below are described with respect to gas distribution and outage management systems, the principles can also be applied to electric distribution and outage systems. In other examples, the disclosure is applied to an advanced distribution management system that manages both gas and electric. Other configurations are possible.

In the examples provided herein, the gas distribution and outage management system is tailored to the business and operation processes of a gas distribution network. This system incorporates data from various sources, including a supervisory control and data acquisition system (sometimes referred to as a SCADA system), which can be used to monitor and/or control various points on a gas distribution network. The system can further incorporate data from a geographic information system (sometimes referred to as a GIS) to geographically track aspects of distribution by the gas distribution network.

Figure 1:
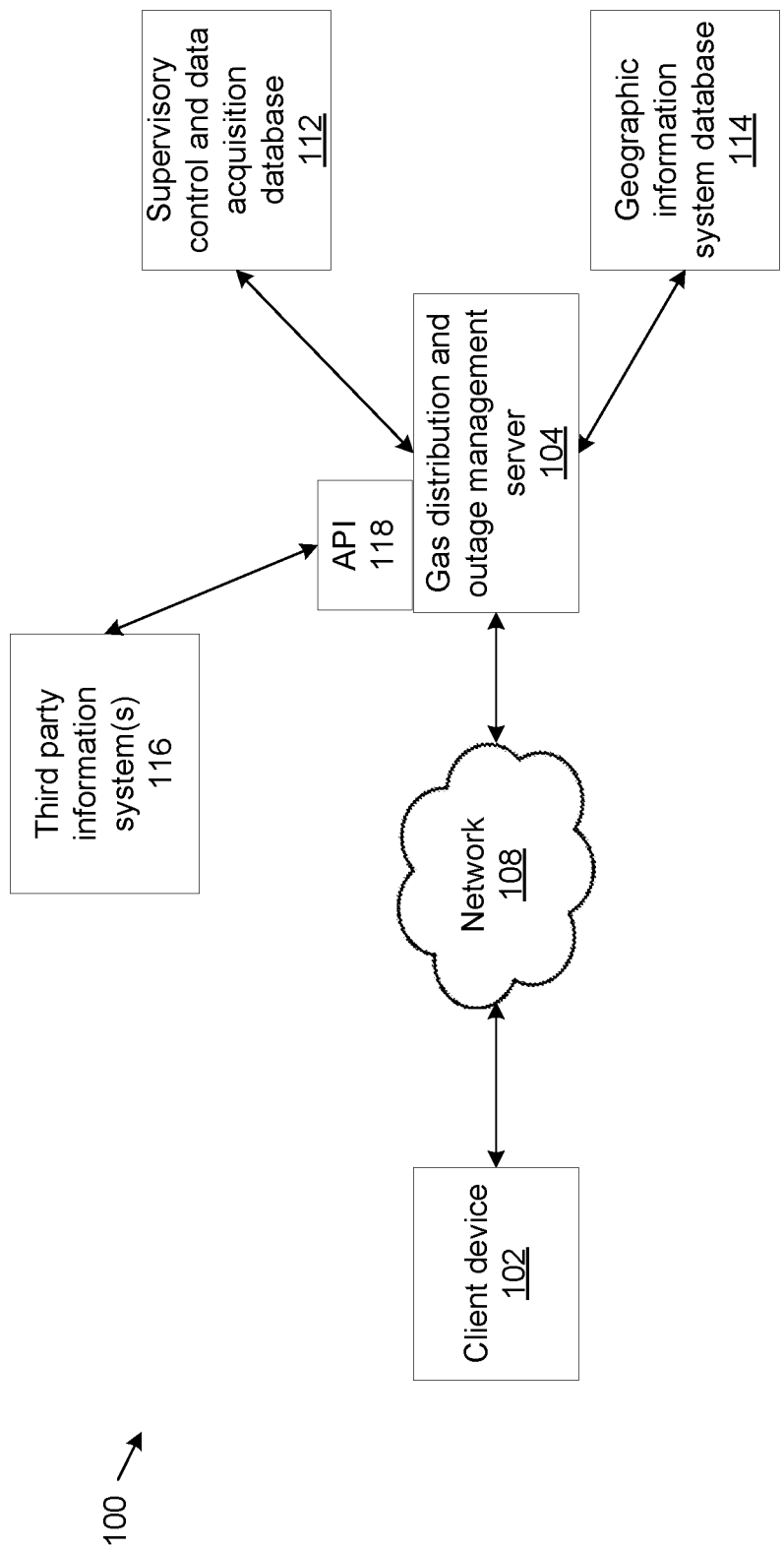
FIG. 1 shows an example gas distribution and outage management system.

FIG. 1 shows an example gas distribution and outage management system 100 that can support and incorporate data from both a SCADA system and a GIS to manage distribution of the gas within a gas distribution network. The network can be implemented in a traditional environment with multiple clients and servers and/or in a cloud-based architecture.

The system 100 includes a client device 102, a gas distribution and outage management server 104, a network 108, a supervisory control and data acquisition database 112, and a geographic information system database 114. More, fewer, or different components are possible. For instance, the system 100 can have many client devices and multiple computing devices that form the gas distribution and outage management server.

Generally, the gas distribution and outage management server 104 accesses data from the supervisory control and data acquisition database 112 and the geographic information system database 114. The supervisory control and data acquisition database 112 and the geographic information system database 114 can be distributed over a plurality of databases. The gas distribution and outage management server 104 can be programmed to access data from the supervisory control and data acquisition database 112 and the geographic information system database 114 to obtain necessary data, as described further below. For instance, in some scenarios, the gas distribution and outage management server 104 performs one or more queries (e.g., using Structured Query Language (SQL)) to access the data. Other configurations are possible. The gas distribution and outage management server 104 can include a plurality of computing devices, including a server farm or other cloud computing architectures.

Other inputs and outputs can optionally be provided for the gas distribution and outage management server 104. For instance, the gas distribution and outage management server 104 can consume data from other systems through various interfaces, such as application programmed interfaces (APIs). One such example is the gas distribution and outage management server 104 receiving work order information from a work order dispatch system through an API. The work order information can be used by the gas distribution and outage management server 104 to manage various changes that are made to the system 100 through such work.

Other examples of such information include meter information provided by an advanced metering infrastructure (AMI) system including a system of smart meters that enables two-way communication (wired or wirelessly) between individual smart meters and the system 100. The data from the AMI system can provide near real-time statuses (e.g., consumption) of smart meters within the system 100.

For example, as depicted, the work order dispatch system, the AMI system, and/or other similar systems (such as a customer information system (CIS)) are depicted as optional third party information system(s) 116. These third party information system(s) 116 provide information to the gas distribution and outage management server 104 through an example API 118. For instance, near real-time metering information from the AMI system (third party information system(s) 116) can be provided to the gas distribution and outage management server 104 through the API 118. Other configurations are possible.

The example network 108 is a computer network and can be any type of wireless network, wired network and cellular network, including the Internet. The client device 102 communicates with the gas distribution and outage management server 104 through the network 108.

The client device 102 displays one or more user interfaces associated with data accessed from the gas distribution and outage management server 104. For instance, as described further below with reference to FIGS. 3-9, the client device 102 can display near real-time information associated with the distribution of gas in a gas distribution network, including outages and shutoffs associated therewith.

Figure 2:
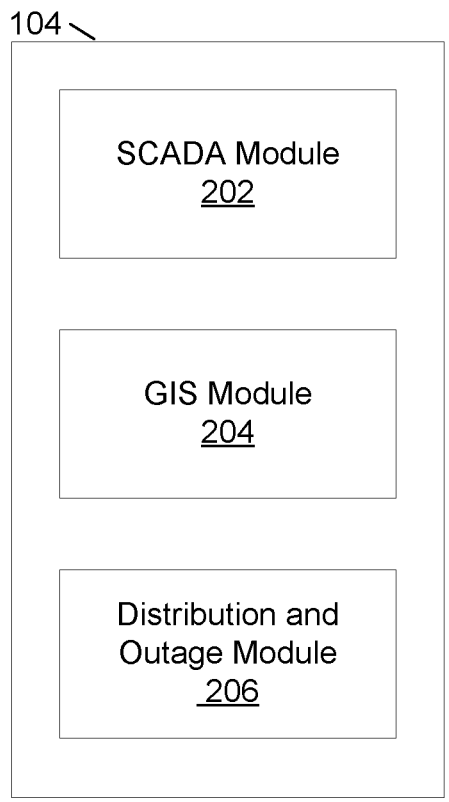
FIG. 2 shows example modules of a gas distribution and outage management server of the system of FIG. 1.

Referring now to FIG. 2, example logical components of the gas distribution and outage management server 104 of the system 100 are shown. These include, without limitation, a SCADA module 202, a GIS module 204, and a distribution and outage module 206. These modules can be implemented on the gas distribution and outage management server 104 as one or more applications that provide the functionality of the gas distribution and outage management server 104 of the system 100. The modules can also be implemented separately on one or more separate servers.

The SCADA module 202 is programmed to access data from the supervisory control and data acquisition database 112. This data can include infrastructure management data associated with a gas distribution network. Examples of such data include information about the various components of the gas distribution network, such as the pipes, mains, regulators, valves, etc.

The GIS module 204 is programmed to access data from the geographic information system database 114. This data can include spatial and geographic data associated with the location of the components of the gas distribution network.

The distribution and outage module 206 integrates data from both the SCADA module 202 and the GIS module 204 to allow system 100 to manage distribution and outages/shutoffs associated with the gas distribution network. For instance, the distribution and outage module 206 is programmed to identify valving sequences to isolate portions of the gas distribution network for planned or emergency work and then track affected services that are shutoff for both planned and emergency work. The distribution and outage module 206 can also identify the effects of gas pressures and flows under normal and abnormal states.

Specifically, the distribution and outage module 206 is programmed to provide a highly redundant, readily available system to perform such frequent tasks in near real time. Because the distribution and outage module 206 ties information together data from both the SCADA module 202 and the GIS module 204, an operator of the gas distribution network can study the impact of an upcoming maintenance activity before performing the action or have awareness of how current abnormalities (outages or shutoffs) of the network are impacting distribution.

Figure 3:
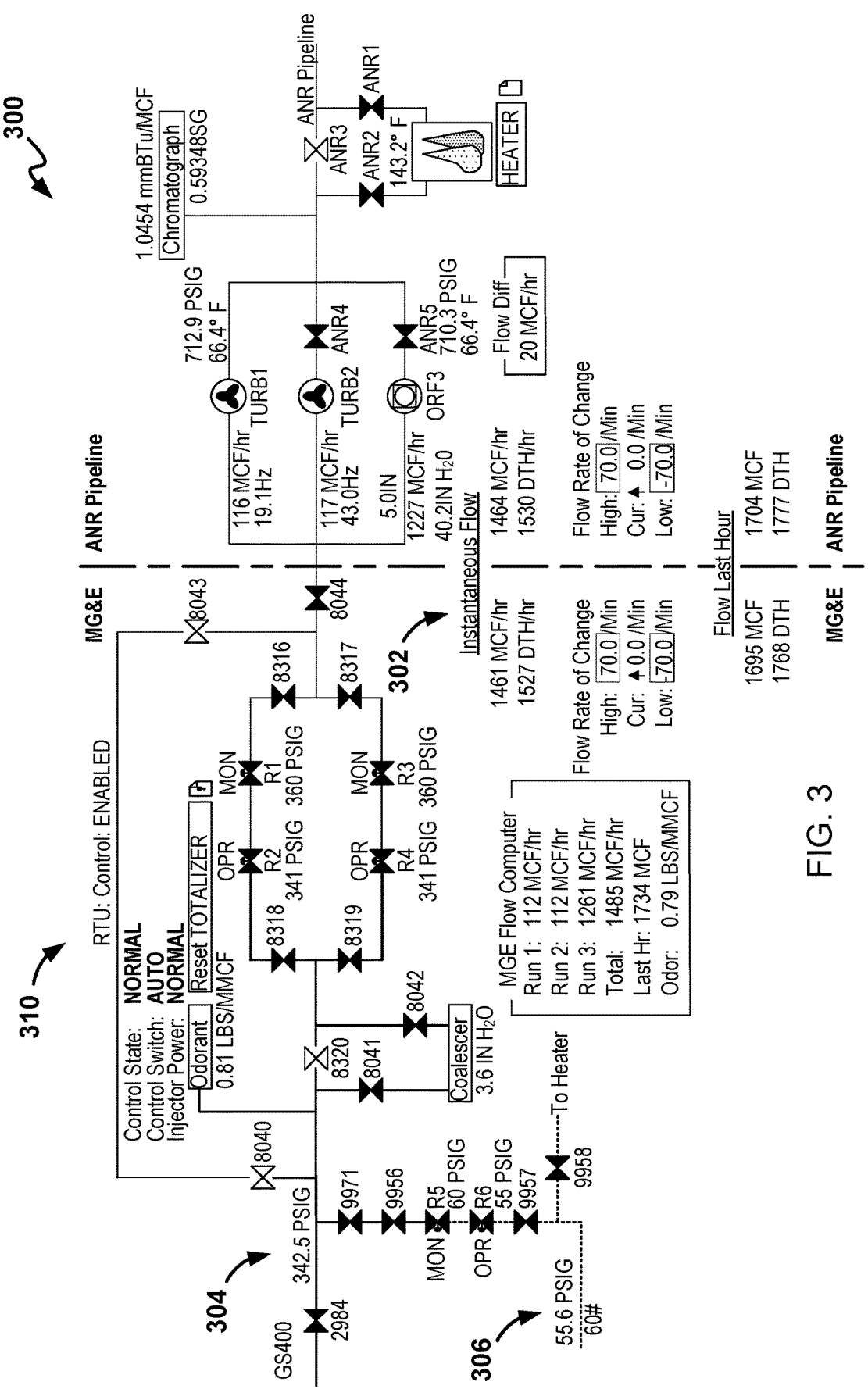
FIG. 3 shows an example user interface generated by a supervisory control and data acquisition module of FIG. 2.

One example user interface 300 of FIG. 3 is generated using data from the SCADA module 202. The interface 300 can be displayed, for instance, on the client device 102 to allow the operator to manage the distribution within a gas distribution network 310 that is schematically displayed on the interface 300.

As depicted, measurements and flows associated with the gas distribution network 310 are shown on the interface 300. For instance, the interface 300 shows characteristics of the gas flowing into the gas distribution network 310, such as the instantaneous flow 302 (being measured at 1461 MCF/hr) and a pressure 304 (of 342.5 PSIG (pounds per square inch of gas)) on the 400-pound network and a pressure 306 (of 55.6 PSIG) on the 60-pound network. Such information, including other information like the states of valves, can be accessed and mirrored on one or more of the interfaces generated by the distribution and outage module 206, as described further below.

The distribution and outage module 206 uses data from the SCADA module 202 (such as depicted in FIG. 3) along with the spatial and geographic data from the GIS module 204 to provide various interfaces on the client device 102 to allow for greater control of the distribution of gas within the network.

As a base layer of such interfaces generated by the distribution and outage module 206, the gas distribution and outage management server 104 provides items like a gas main (including possibly gas services), which can be defined according to attributes including diameter, material, roughness, etc. Other items include valves (e.g., defined by material, PSI rating, valve status (e.g., normally opened or closed), etc.), and gas regulators (which regulate output pressures), including such attributes as input pressure, output pressure, capacity, address, and/or regulator number, etc.

The base layer can also include items associated with customers, such as basic customer information like address, name, account, amount of load. Further, gas loads (approximate normal gas use by service/customer) and gas service points can be provided by the gas distribution and outage management server 104. Finally, the base layer can include information associated with the gas insertion point, as typically defined by the SCADA module 202 (usually cubic feet of gas flow and pressure associated).

These items defined in the base layer are integrated by the distribution and outage module 206 from the data provided by the SCADA module 202 and the GIS module 204 to provide a visual understanding of the distribution within the gas distribution network 310. Such an understanding includes an awareness of the portions of the system that are provided on radials, so that outage risks associated with areas under construction can be more easily assessed.

The distribution and outage module 206 further provides gas isolation tracing so that shutoff risk can be addressed. This includes gas valve identification, which is a list of valves to close to shut off gas to a given area. Further, the distribution and outage module 206 provides gas service identification so that customers impacted by shutoffs can be readily identified and tracked. See FIGS. 11-12, described further below. Further, attributes associated with distribution of gas during an outage or shutoff can be illustrated, including pressure and flow effects prior to, during, and after the outage or shutoff. Gas valve states (e.g., open or closed) can also be depicted.

In some examples, a dynamic state layer can be provided on top of the base layer. This dynamic state layer depicts the relative state of a portion of the network during an outage or shutoff. Such items can include valve states, regulator states, ties to new or existing modeled devices, and/or squeezes or cut offs of existing pipes. Such a dynamic layer can be overlaid upon the base layer when needed and removed when the dynamic state no longer exists in the network (e.g., once the outage or shutoff is resolved).

Further, temporal aspects associated with changes in the network can be depicted. For instance, a gas future layer for future equipment that can be put in service can be provided. Similarly, a gas retired layer can be provided to depict, for instance, abandoned pipe that remains in the ground for awareness. Further, a gas damage point layer can be provided, which depicts temporary damage and can automatically trigger isolation tracing and notifications to relevant personnel. These temporary layers can be added and removed as needed (e.g., after the specific issue has been resolved).

The distribution and outage module 206 is programmed to address outages in the network. As noted, this can include tracking customers that are shutoff due to isolation for various reasons, such as damage. Such customers can require shutting off and re-lighting when the network is restored. Another similar outage is associated with a gas-related call entry tool (for leaks, damages, low pressure, re-lights, etc.).

Figure 11:
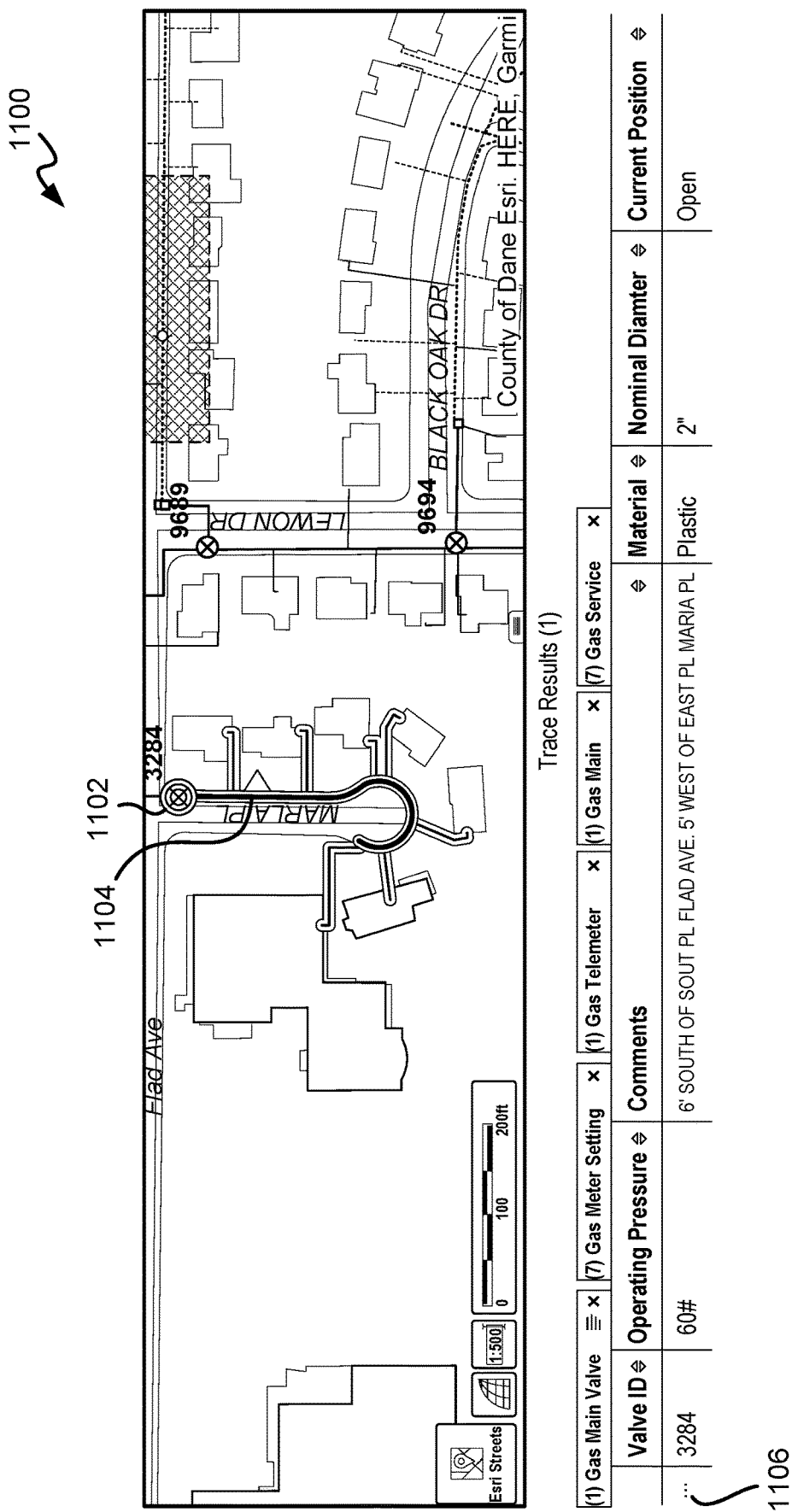
FIG. 11 shows a portion of another example user interface generated by a distribution and outage module of the gas distribution and outage management server of FIG. 2.

For example, FIG. 11 shows an interface 1100 generated by the distribution and outage module 206 when a valve 1102 is closed to isolate pipe 1104 (indicated by haloing). The distribution and outage module 206 further provides information 1106 associated with the selected valve 1102, including operating pressure, location, material, diameter, and current position.

Figure 12:
FIG. 12 shows a portion of yet another example user interface generated by a distribution and outage module of the gas distribution and outage management server of FIG. 2.

Referring to FIG. 12, once service is restored, an interface 1200 is provided that shows the valve 1102 in the open position and gas flowing in the pipe 1104. In addition, the impacted properties are listed as information 1206, including meter number, address, customer name, contact information (telephone numbers), meter location, customer classification, etc.

In addition, gas valve sequencing information can be provided by the distribution and outage module 206 so that a manual and/or automated sequence of valve openings or closings is provided to allow for isolation of sections of the network for planned and unplanned maintenance activities.

Further layering can include purging gas areas, which are associated with locations where customers may report gas leaks. In addition, gas network flow attributes can be provided, which includes flows and pressures on the network for real time awareness of weak points of the network for planning or operational reasons and over pressurization checks.

Optionally, the distribution and outage module 206 can provide gas cathodic system information associated with anodes tied to steel pipes. This system provides a battery charge on the pipes that maintains a small voltage to minimize corrosion. The distribution and outage module 206 would optionally monitor and depict aspects associated with the voltages. For instance, the voltages associated with various points in the gas cathodic system could be depicted so that repair and/or replacement can be provided when necessary.

Another possible component of the system 100 is a gate/regulator station item having an internal model that simplifies the setup of paralleled and series connected gas regulators. For instance, the gate/regulator station item can summarize the output of multiple regulators as a single component for calculation purposes. This simplifies the calculations needed to determine performance aspects of the network. For example, regulators on two parallel runs of pipe, each having a capacity of X, can be simplified by the gate/regulator station item as a single component having a capacity of 2X. Other configurations are possible.

Figure 4:
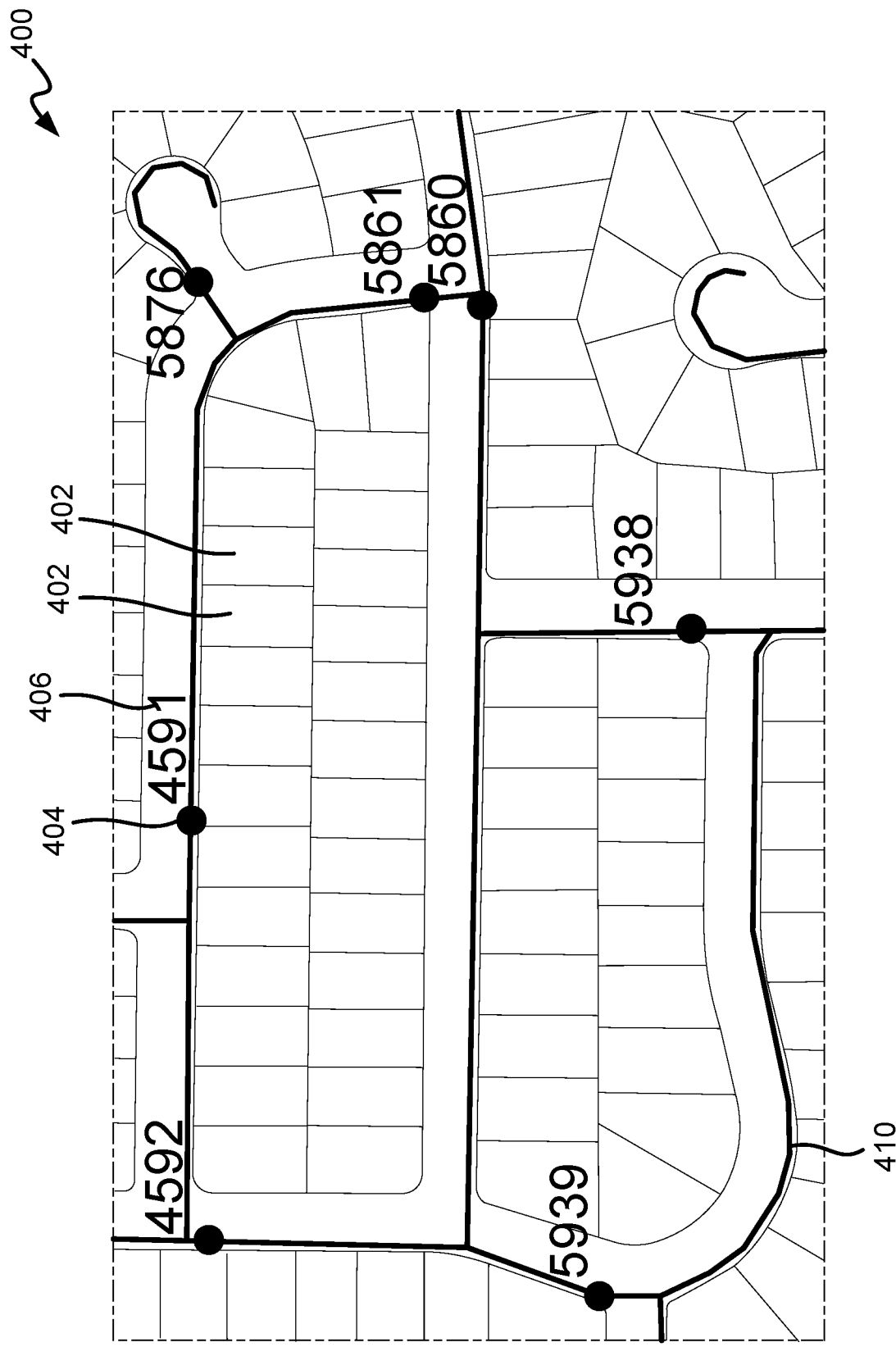
FIG. 4 shows an example user interface generated by a distribution and outage module of the gas distribution and outage management server of FIG. 2.

Referring now to FIG. 4, an example interface 400 of the client device 102 is shown. The interface 400 is generated by the distribution and outage module 206 based upon the modeling information provided by the SCADA module 202 and the GIS module 204.

The interface 400 includes a plurality of customers 402 (in this instance, plots of land). The interface 400 also includes dots 406 to signify open gas valves that allow gas to flow through freely (red to visualize open with gas flowing as shown; yellow to visualize closed). A number 406 (e.g., "4591") uniquely identifies each valve. A pipe network 410 (lines with blue for open with flowing gas) represent gas distribution pipes that transport gas. In this case, all pipes in the network 410 are in their normal state with open valves and undamaged pipes.

Figure 5:
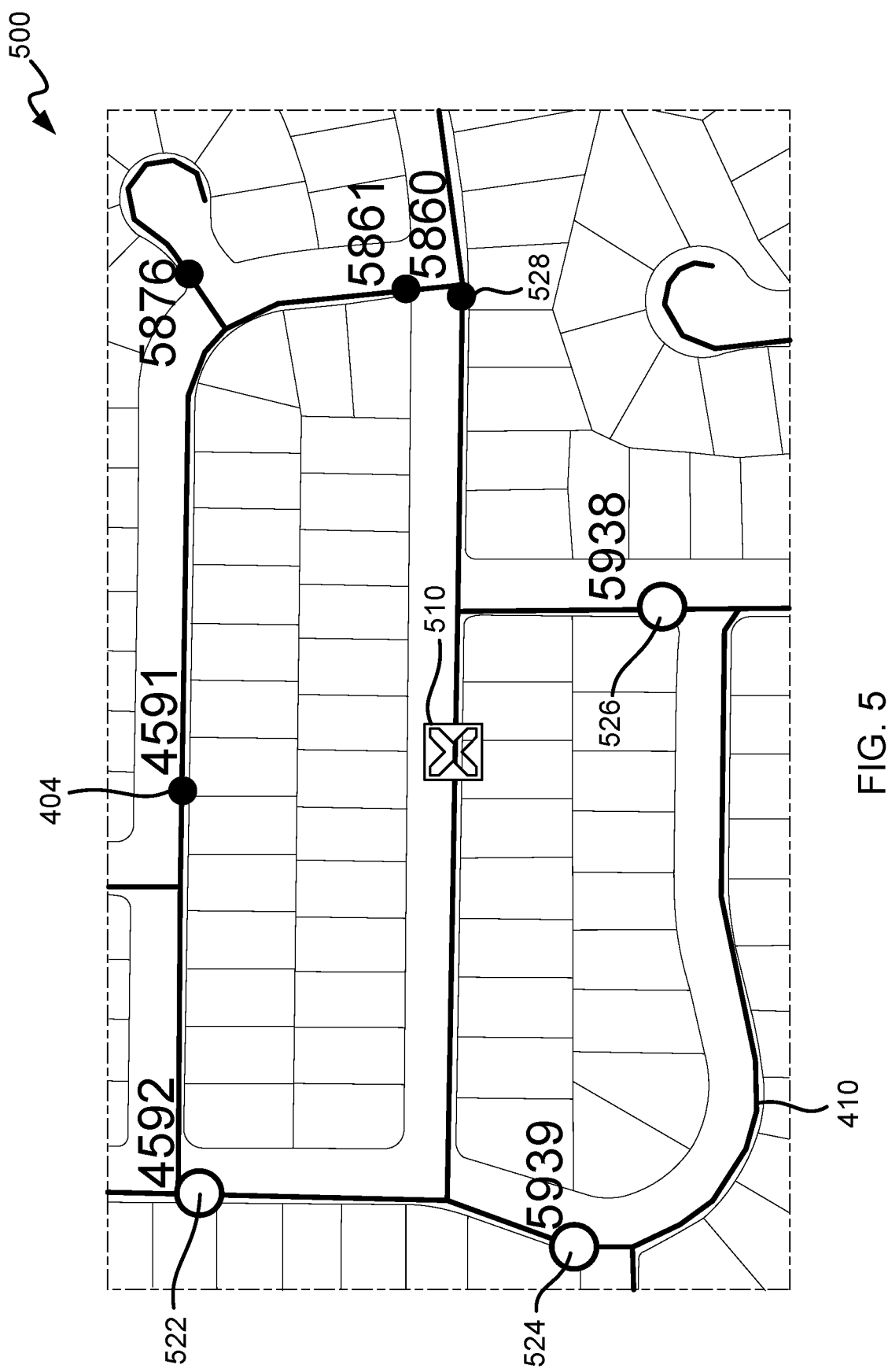
FIG. 5 shows another example user interface generated by the distribution and outage module of the gas distribution and outage management server of FIG. 2.

FIG. 5 illustrates a similar interface 500, except this interface 500 shows a gas valve isolation trace. Specifically, the interface 500 includes a damage indicator 510 (purple square with "X") to signify a location of a damaged pipe in the network. Valves 522, 524, 526 are illustrated as being closed (marked in yellow with a red circle) to indicate that gas does not flow through these valves in order to isolate the area designed by the damage indicator 510. However, valve 528 (number "5860") remains open, allowing gas to flow through the pipe associated with the damage indicator 510, so the pipes continue to remain blue.

Figure 6:
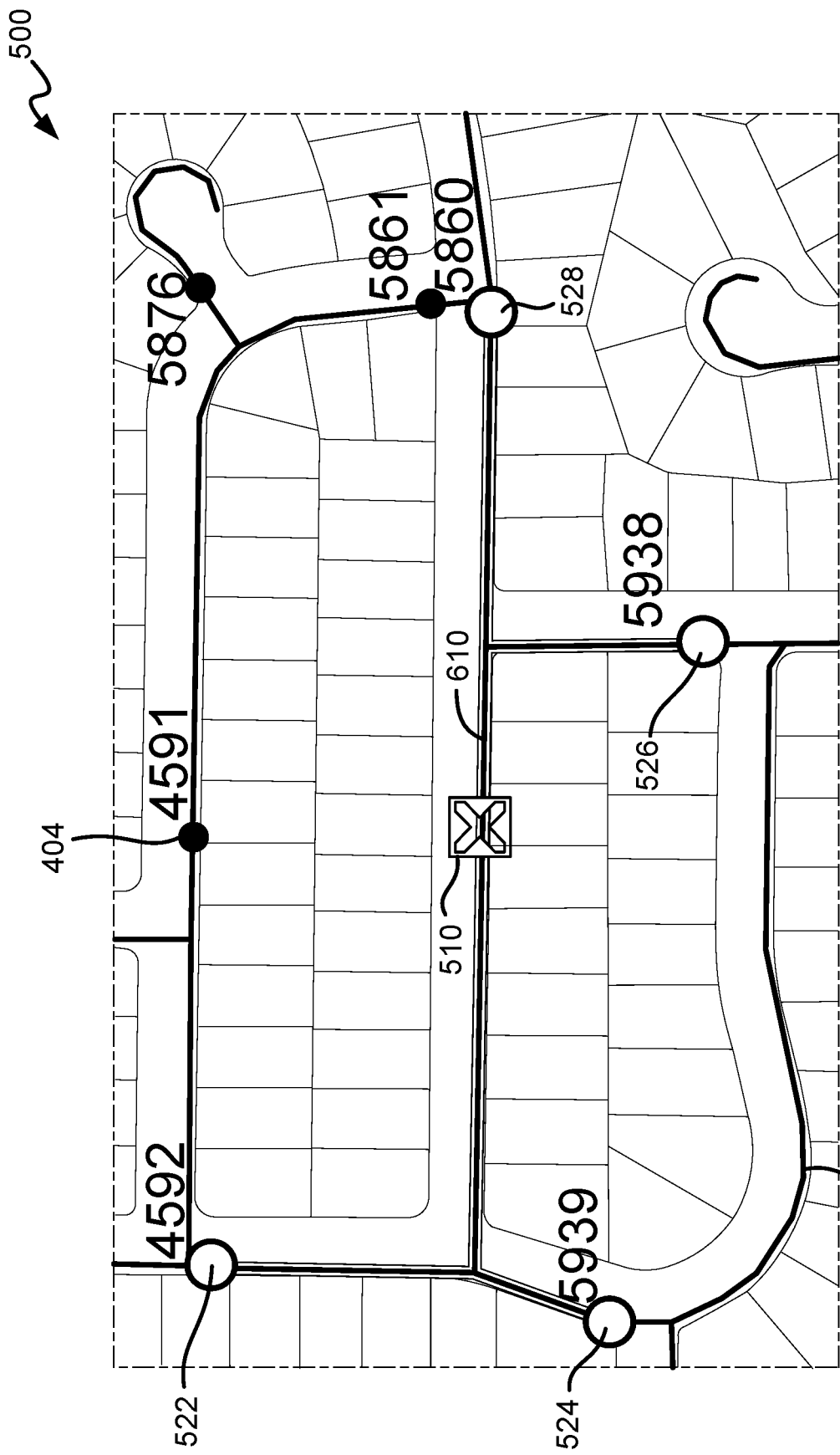
FIG. 6 shows another example user interface generated by the distribution and outage module of the gas distribution and outage management server of FIG. 2.

Referring to FIG. 6, after the valve 528 is closed (marked in yellow with a red circle) the section 610 of pipe (illustrated with haloing) is isolated so that gas is no longer flowing through the section 610 of pipe associated with the damage indicator 510. A valve isolation trace identifies those four valves (522, 524, 526, 528) required to be shut off as well as a list of affected customers to accomplish the desired isolation of the section 610. Other similar methods of indicating such isolation can be used.

Figure 7:
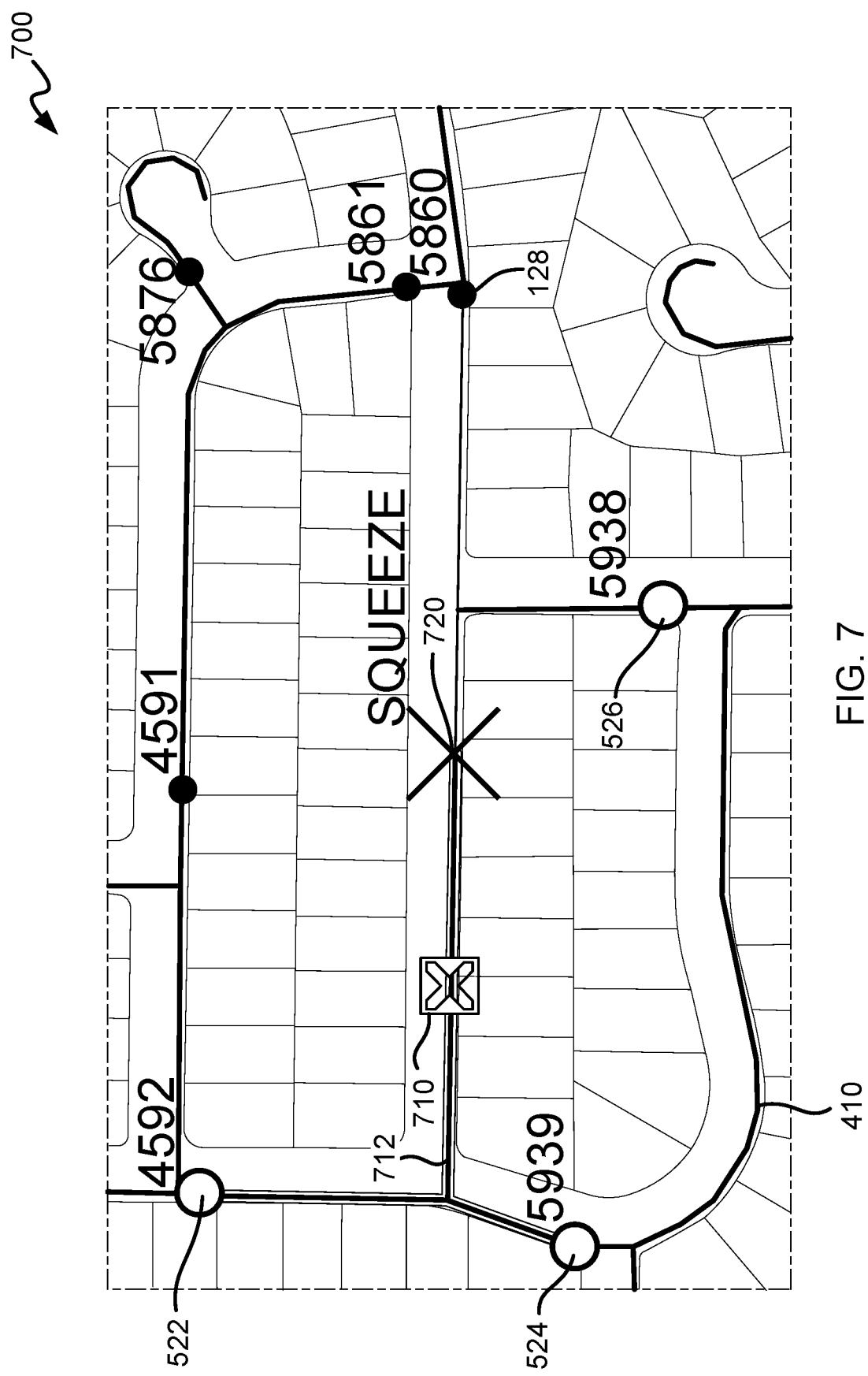
FIG. 7 shows another example user interface generated by the distribution and outage module of the gas distribution and outage management server of FIG. 2.

Another similar example is provided in the interface 700 shown in FIG. 7, except a squeeze point is simulated. In this example, a damage indicator 710 is provided, and a squeeze point 720 is used along with the closing of valves 522 and 524 to provide a section 712 of the pipe network 410 that is isolated for the pipe associated with the damage indicator 710. The squeeze point 720 allows for two less valves (i.e., valves 526, 528) to be closed, thereby limiting the impacted customers. Similar configurations are possible.

Figure 8:
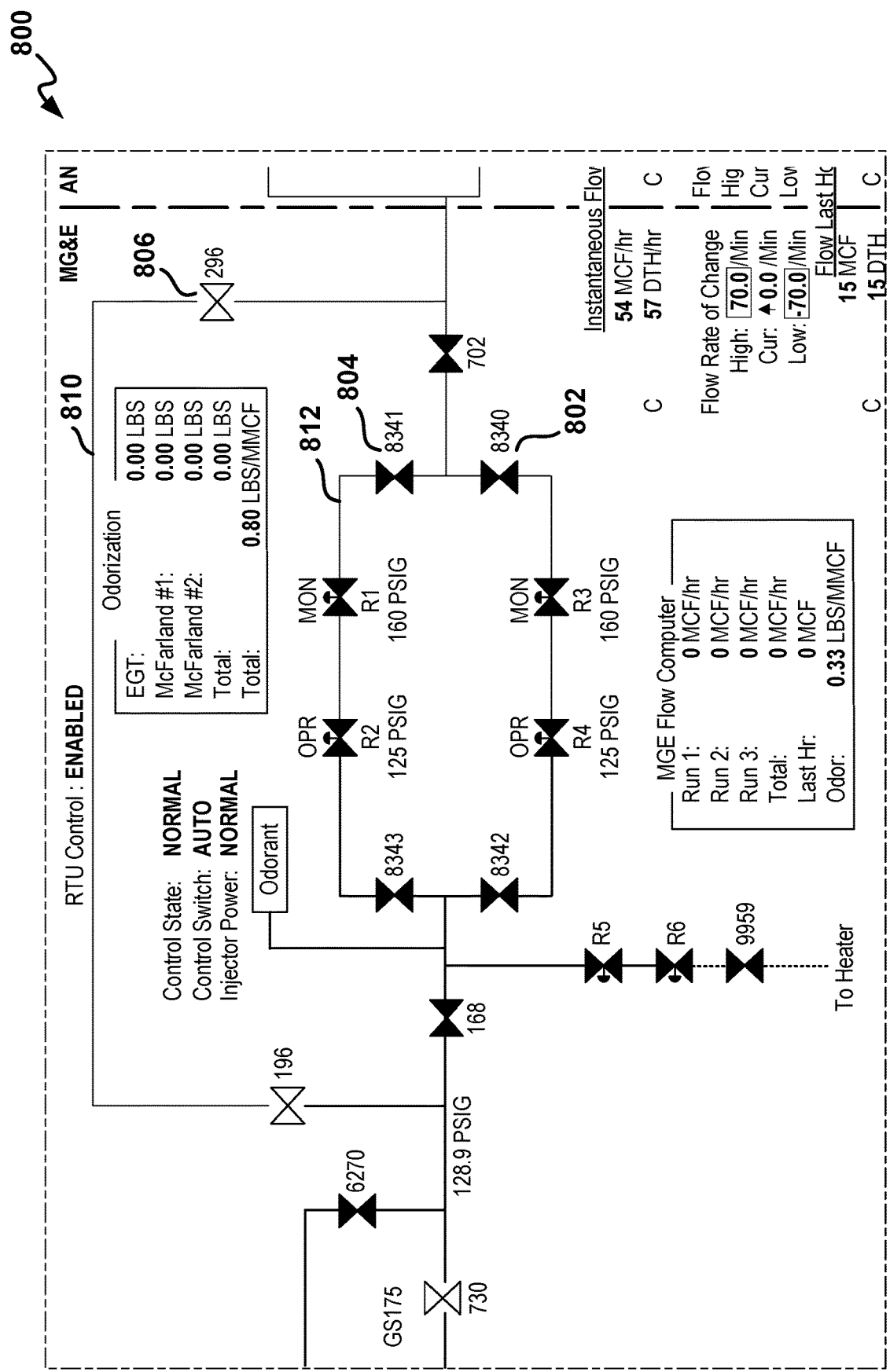
FIG. 8 shows another example user interface generated by the supervisory control and data acquisition module of FIG. 2.
Figure 9:
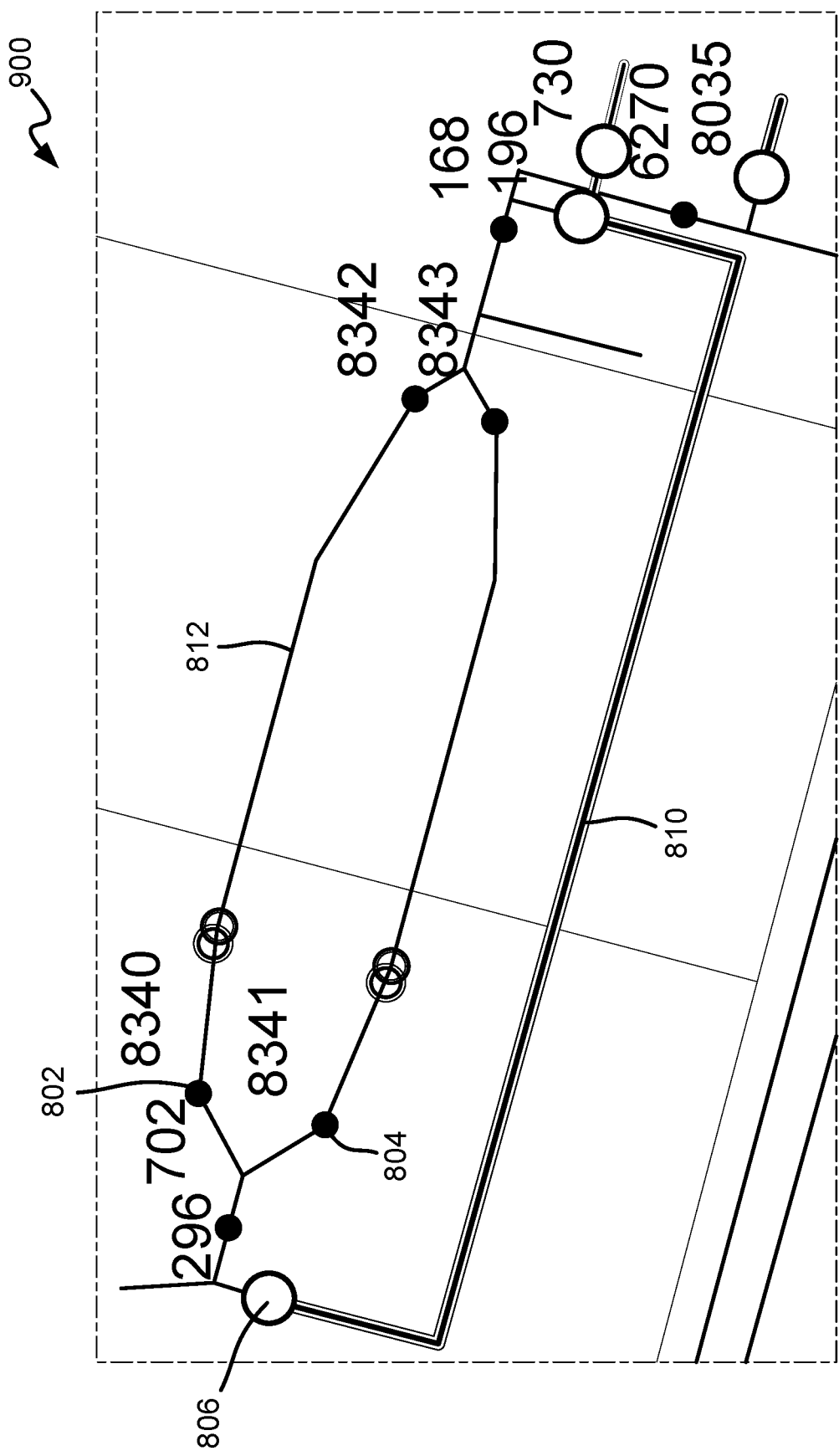
FIG. 9 shows another example user interface generated by the distribution and outage module of the gas distribution and outage management server of FIG. 2.

Referring now to FIGS. 8-9, an example interface 800 generated by the SCADA module 202 and a resulting interface 900 generated by the distribution and outage module 206 are shown.

The interface 800 depicts aspects of another gas distribution network 801 managed by the SCADA module 202. This includes flow characteristics and pipelines 810, 812. In addition, such information as open valves 802, 804 and closed valves 806 is depicted.

The interface 900 depicts the same aspects of the gas distribution network 801 as managed by the distribution and outage module 206. By incorporating the infrastructure management data from the SCADA module 202 and the spatial and geographical information from the GIS module 204, the interface 900 provides near real-time information and the ability to manage distribution and outages/shutoffs associated with the gas distribution network 801.

Specifically, the valves 802, 804 are depicted as being open and spatially oriented correctly on the interface 900 by the distribution and outage module 206. Further, the valve 806 is depicted as being closed, and the pipeline 810 is haloed to indicate that gas is not flowing therethrough. By accurately displaying the infrastructural components in space, a more accurate understanding of the distribution of gas within the network 801 is provided, particularly when shutoffs and outages occur.

Figure 10:
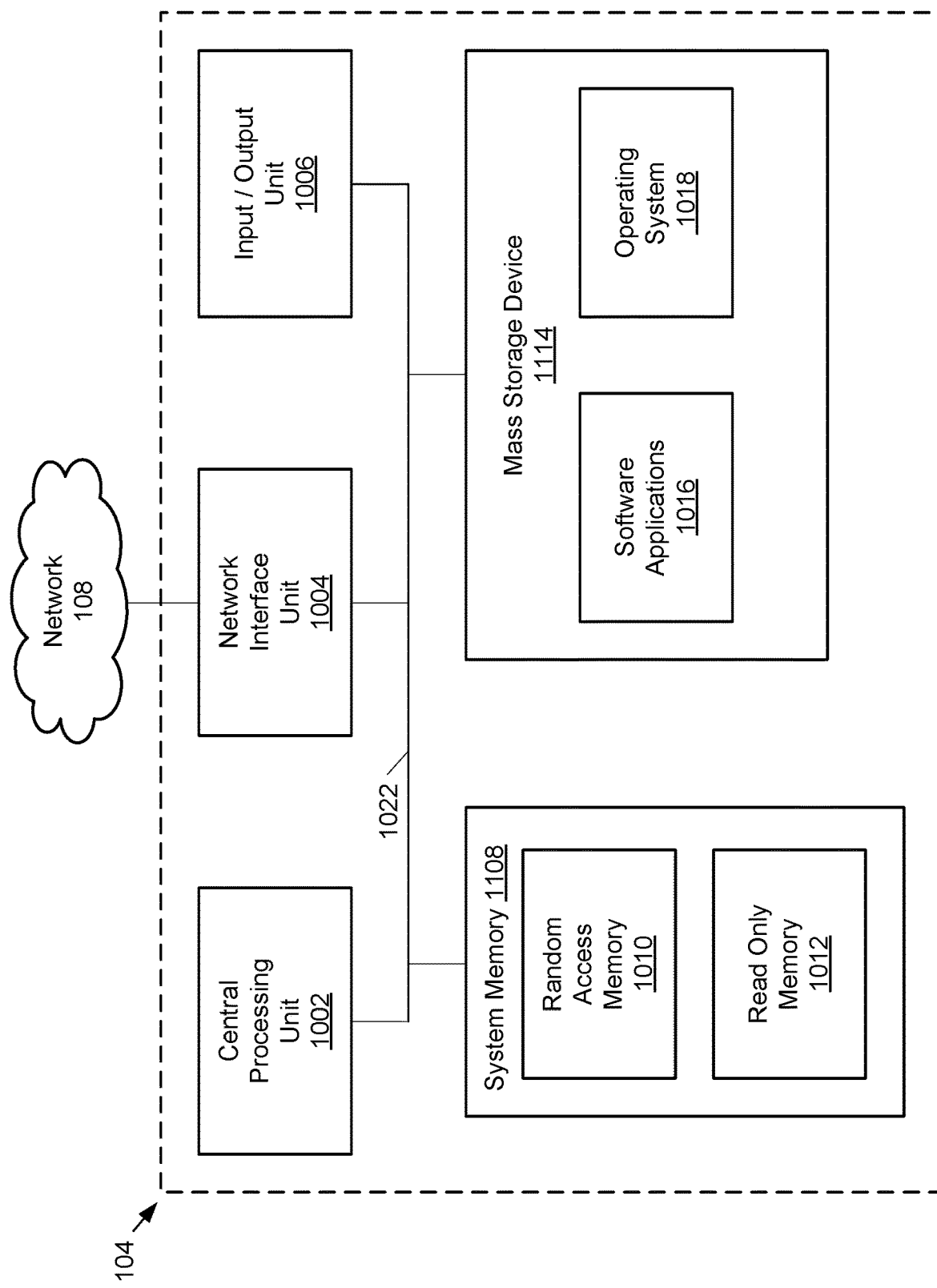
FIG. 10 shows example physical components of the gas distribution and outage management server of the system of FIG. 1.

As illustrated in the example of FIG. 10, the gas distribution and outage management server 104 includes at least one computing device with at least one central processing unit ("CPU") 1002, also referred to as a processor, a system memory 1008, and a system bus 1022 that couples the system memory 1008 to the CPU 1002. The system memory 1008 includes a random access memory ("RAM") 1010 and a read-only memory ("ROM") 1012. A basic input/output system that contains the basic routines that help to transfer information between elements within the gas distribution and outage management server 104, such as during startup, is stored in the ROM 1012. Each computing device further includes a mass storage device 1014. The mass storage device 1014 is able to store software instructions and data. Some or all of the illustrated components of the computing device can also be included in the client device 102.

The mass storage device 1014 is connected to the CPU 1002 through a mass storage controller (not shown) connected to the system bus 1022. The mass storage device 1014 and its associated computer-readable data storage media provide non-volatile, non-transitory storage for the computing device. Although the description of computer-readable data storage media contained herein refers to a mass storage device, such as a hard disk or solid state disk, computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device.

According to various embodiments, the computing device may operate in a networked environment using logical connections to remote network devices through the network 108, such as a wireless network, the Internet, or another type of network. The computing device may connect to the network 108 through a network interface unit 1004 connected to the system bus 1022. It should be appreciated that the network interface unit 1004 may also be utilized to connect to other types of networks and remote computing systems. The computing device also includes an input/output controller 1006 for receiving and processing input from a number of input devices. Similarly, the input/output controller 1006 may provide output to a display screen or other type of output device.

As mentioned briefly above, the mass storage device 1014 and the RAM 1010 of the computing device can store software instructions and data. The software instructions include an operating system 1018 suitable for controlling the operation of the computing device. The mass storage device 1014 and/or the RAM 1010 also store software instructions and software applications 1016, that when executed by the CPU 1002, cause the computing device to provide the functionality of the gas distribution and outage management server 104 discussed herein. For example, the mass storage device 1014 and/or the RAM 1010 can store software instructions that, when executed by the CPU 1002, cause the gas distribution and outage management server 104 to display received data on a display screen of the computing device.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A distribution system, comprising:
   a processor; and
   memory encoding instructions which, when executed by the processor, causes the system to:
   provide a supervisory control and data acquisition module programmed to manage infrastructure elements of a distribution network;
   provide a geographic information system module programmed to manage spatial aspects of the distribution network;
   provide a distribution module programmed to incorporate data from the supervisory control and data acquisition module and data from the geographic information system module to create a data management model; and
   render an interface depicting the data management model.

2. The distribution management system of claim 1, wherein the distribution network is a gas distribution network.

3. The distribution management system of claim 1, wherein the infrastructure elements of the distribution network include pipes, mains, regulators, and valves.

4. The distribution management system of claim 1, wherein the spatial aspects include location of the infrastructure elements of the distribution network.

5. The distribution management system of claim 1, wherein the distribution module is programmed to identify a valving sequence in the infrastructure elements to isolate a portion of the distribution network.

6. The distribution management system of claim 5, wherein the portion is shutoff for planned or emergency work on the distribution network.

7. The distribution management system of claim 1, wherein the interface shows statuses of a plurality of valves associated with the distribution network.

8. The distribution management system of claim 1, wherein the interface shows flow within portions of the distribution network.

9. The distribution management system of claim 8, wherein the flow includes a pressure.

10. The distribution management system of claim 1, wherein the interface includes:
   a base layer showing a gas main, valves, regulators, and pressures associated with the distribution network;
   a dynamic layer positioned on top of the base layer, the dynamic layer showing relative states of portions of the distribution network.

11. A gas distribution management system, comprising:
   a processor; and
   memory encoding instructions which, when executed by the processor, causes the system to:
      provide a supervisory control and data acquisition module programmed to manage infrastructure elements of a gas distribution network;
      provide a geographic information system module programmed to manage spatial aspects of the gas distribution network;
      provide a distribution module programmed to incorporate data from the supervisory control and data acquisition module and data from the geographic information system module to create a data management model;
      render an interface depicting the data management model.

12. The gas distribution management system of claim 11, wherein the infrastructure elements of the gas distribution network include pipes, mains, regulators, and valves.

13. The gas distribution management system of claim 11, wherein the spatial aspects include location of the infrastructure elements of the gas distribution network.

14. The gas distribution management system of claim 11, wherein the distribution module is programmed to identify a valving sequence in the infrastructure elements to isolate a portion of the gas distribution network.

15. The gas distribution management system of claim 14, wherein the portion is shutoff for planned or emergency work on the gas distribution network.

16. The gas distribution management system of claim 11, wherein the interface shows statuses of a plurality of valves associated with the gas distribution network.

17. The gas distribution management system of claim 11, wherein the interface shows flow within portions of the gas distribution network.

18. The gas distribution management system of claim 17, wherein the flow includes a pressure.

19. The gas distribution management system of claim 11, wherein the interface includes:
   a base layer showing a gas main, valves, regulators, and pressures associated with the gas distribution network;
   a dynamic layer positioned on top of the base layer, the dynamic layer showing relative states of portions of the gas distribution network.

20. The gas distribution management system of claim 19, wherein the dynamic layer includes outages associated with the gas distribution network.

* * * * *